No. 857,805. PATENTED JUNE 25, 1907.
D. HINDERLITER.
VALVE.
APPLICATION FILED DEC. 28, 1906.
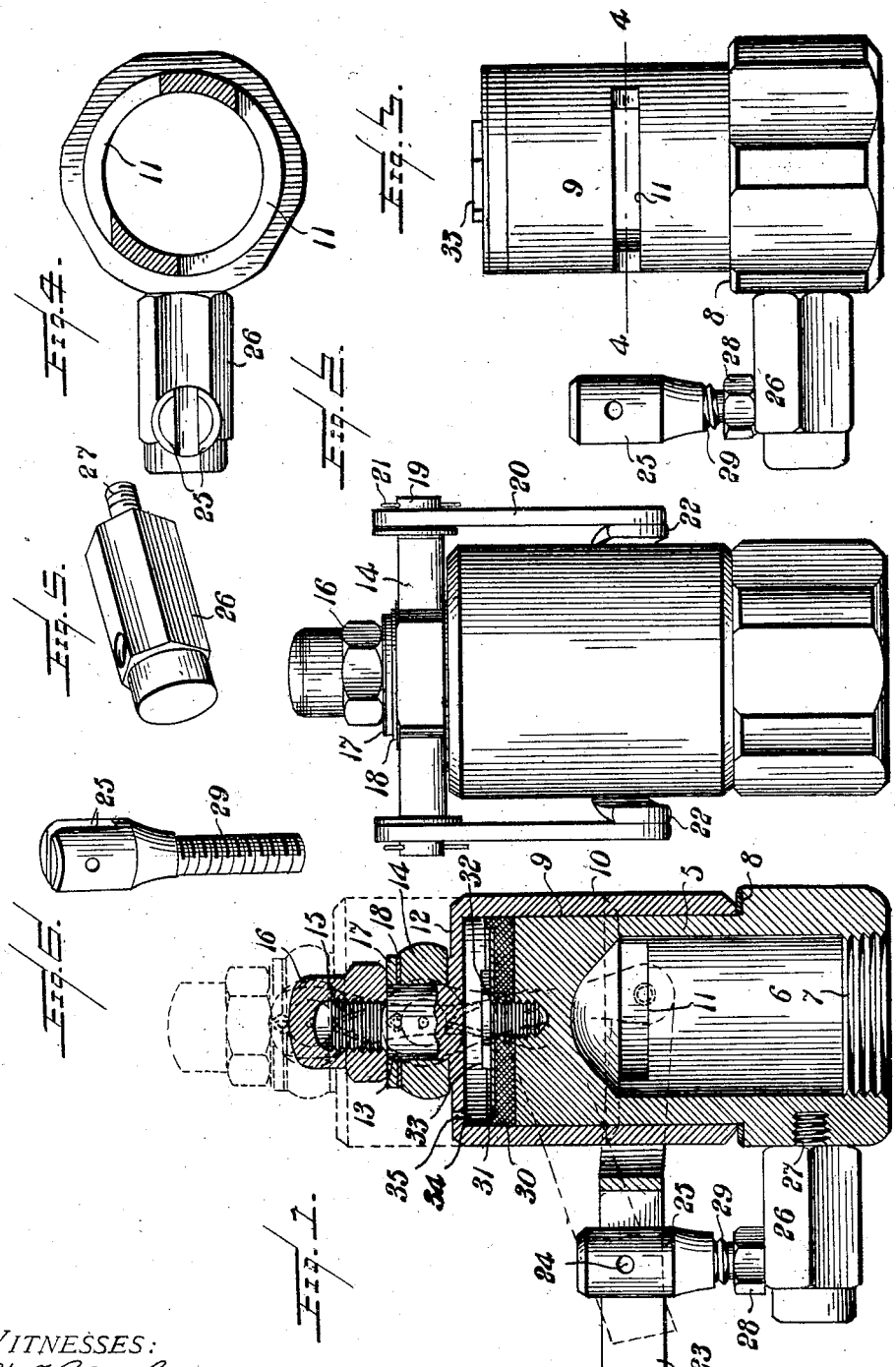

UNITED STATES PATENT OFFICE.

DANIEL HINDERLITER, OF CATAWISSA, PENNSYLVANIA.

VALVE.

No. 857,805.   Specification of Letters Patent.   Patented June 25, 1907.

Application filed December 28, 1906. Serial No. 349,818.

*To all whom it may concern:*

Be it known that I, DANIEL HINDERLITER, a citizen of the United States, residing at Catawissa, in the county of Columbia and State of Pennsylvania, have invented a new and useful Valve, of which the following is a specification.

This invention relates to cut-off valves of that general class especially designed for use in connection with flushing tanks of water-closets and the like for controlling the supply of water to the tank.

The object of the invention is to provide a valve having inlet ports formed therein and provided with a sliding valve casing adapted to close the ports when the water in the tank reaches a pre-determined height and automatically open said ports when the water in the tanks is discharged.

A still further object of the invention is to generally improve this class of devices so as to increase their utility, durability and efficiency.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a vertical sectional view partly in section of a cut-off valve constructed in accordance with my invention. Fig. 2 is a front elevation of the same. Fig. 3 is a side elevation with the sliding casing and its associated parts detached. Fig. 4 is a transverse sectional view taken on the line 4—4 of Fig. 3. Fig. 5 is a detail perspective view of the arm for supporting the float-standard. Fig. 6 is a similar view of the float-standard.

Similar numerals of reference indicate corresponding parts in all of the figures of the drawings.

The improved valve is principally designed for use in connection with flushing tanks for water-closets and the like for controlling the supply of water to the latter.

The valve consists of a substantially cylindrical body portion 5 having a chamber 6 formed therein, the interior walls of which are threaded at 7 for connection with a supply pipe.

The exterior walls of the body portion are provided with an annular shoulder 8 defining a reduced cylindrical portion 9 the exterior walls of which are smooth and unobstructed for engagement with a valve-casing 10. The walls of the extension 9 are provided with oppositely disposed slots or recesses 11 which constitute ports and through which the water from the supply pipe is admitted to the interior of the flushing tank when the water in the latter falls below a pre-determined level.

The valve-casing 10 is closed at its upper end and extending vertically from the closed end 12 of the casing is a pin 13 on which is mounted a cross-head 14. The pin 13 is provided with a reduced threaded extension 15 for engagement with a clamping nut 16 the latter being clamped in engagement with a washer 17 mounted on the pin 13 and bearing against a yieldable gasket 18 preferably interposed between the washer and cross-head, as shown.

The opposite ends of the cross-head 14 are reduced to form terminal bearings 19 on which are pivotally mounted suitable links 20, the latter being retained in position on the bearings 19 by means of cotter pins or similar fastening devices 21, the lower ends of the links 20 being pivotally connected to the forked arms 22 of a float carrying lever 23. The lever 23 is pivotally mounted at 24 between the bifurcated arms of the post or standard 25 which latter is threaded in an arm 26 extending laterally from the enlarged end of the body portion 5. The lever 23 extends upwardly within the tank while the float is carried by the free end of said lever and is spaced from the bottom of the tank so that the water in the tank is free to rise to a pre-determined level before actuating the float to close the valve. The arm 26 is provided with a reduced threaded extension 27 which engages a correspondingly threaded opening formed in the base of the body portion, there being a clamping nut 28 engaging the threads 29 of the standard 25 for clamping the latter into engagement with the arm 26.

Secured to the upper end of the cylindrical extension 9 of the body portion is a packing disk 30 formed of leather, rubber or other yieldable material, said disk being provided with a recess or depression for the reception of a metal washer 31, the washer and disk being secured to the adjacent end of the extension 9 by a threaded pin or screw 32. The screw 32 is provided with an enlarged head 33 which serves to clamp the plate or disk in engagement with the end of the cylindrical extension 9 and also serves to space the end of the extension from the closed end of the valve-casing thereby to form an intermediate air-chamber or compartment 34 and thus retard the movement of the valve-casing.

An opening 35 is formed in the top of the valve-casing 10 and communicates with the chamber 34 thereby to permit the escape of air within the chamber when the valve-casing is actuated to close the inlet ports in the body portion. The shoulder 8 is preferably provided with a metal packing ring formed of Babbitt metal or other suitable material so as to form a water tight joint between the body portion and casing.

In operation water is admitted to the interior of the tank through the ports 11 and when the water reaches a predetermined height it will elevate the float and actuate the casing 10 to close the ports, there being sufficient space between the exterior walls of the body portion 9 and the interior walls of the casing 10 to permit the gradual escape or leakage of water into the tank so that the float will rise to its full limit and thus force the casing to its seat on the shoulder 8.

As soon as the water in the tank is discharged the float will fall a pre-determined distance and in doing so will elevate the valve-casing so as to expose the ports and thus permit the water from the supply pipe to enter the tank, as will be readily understood.

Attention is called to the fact that the head 33 of the pin serves to receive the impact of the valve-casing and thus prevent injury to the extension of the body portion as well as to insure an air space between the extension and adjacent end of the head under all circumstances.

It will also be noted that by making the standard 25 and the arm 26 detachable said parts may be readily removed and replaced when the same become worn, thus obviating the necessity of requiring a new casting should any of the parts become accidentally broken or otherwise injured.

While the valve is principally designed for use in connection with flushing tanks it is obvious that the same may be used with equally good results on railway water tanks, cisterns or wherever a valve of this character is found desirable.

From the foregoing description it will be seen that there is provided an extremely simple, inexpensive and efficient valve which will operate to automatically cut off water under any pressure and which may be readily taken apart and cleaned when necessary.

Having thus described the invention what is claimed is:

1. A valve including a hollow body portion having a reduced cylindrical extension provided with ports, a packing disk secured to the top of the extension and conforming to the shape thereof, a screw piercing the packing and extension and provided with an enlarged head, a casing slidably mounted on the extension and having its closed end provided with an air vent, a cross-head mounted on the closed end of the casing, a pivoted float-carrying lever provided with forked arms embracing the casing and adapted to actuate the same to open and close the ports, and links forming a pivotal connection between the opposite ends of the cross-head and the forked arms of the float-carrying lever.

2. A valve including a hollow body portion provided with an annular shoulder defining a reduced cylindrical extension, the walls of which are formed with oppositely disposed ports, a lateral arm threaded in the base of the body portion, a standard threaded in the arm and having its free end bifurcated, a casing slidably mounted on the extension and having its upper end closed and provided with a vent opening, a cross-head carried by the closed end of the valve-casing, a packing secured to the upper end of the cylindrical extension, a screw engaging the packing and extension and provided with an enlarged head for spacing the closed end of the valve-casing from the adjacent end of the extension, a float-carrying lever pivoted in the bifurcated end of the standard and provided with forked arms for actuating the casing to open and close the ports, links forming a pivotal connection between the opposite ends of the cross-head and the forked arms, and a clamping nut engaging the threads on the standard and bearing against the laterally extending arm.

In testimony that I claim the foregoing as my own, I have hereto affixed my signature in the presence of two witnesses.

DANIEL HINDERLITER.

Witnesses:
J. H. RINARD,
GEORGE H. VOSTINE.